United States Patent [19]
Wirth

[11] Patent Number: 5,336,542
[45] Date of Patent: Aug. 9, 1994

[54] INSULATION OF THERMAL MACHINES

[75] Inventor: Anton Wirth, Kollbrunn, Switzerland

[73] Assignee: Isolfeu AG, Zürich, Switzerland

[21] Appl. No.: 989,011

[22] PCT Filed: Jun. 10, 1992

[86] PCT No.: PCT/CH92/00110
 § 371 Date: Mar. 12, 1993
 § 102(e) Date: Mar. 12, 1993

[87] PCT Pub. No.: WO93/00506
 PCT Pub. Date: Jan. 7, 1993

[30] Foreign Application Priority Data
Jun. 25, 1991 [DE] Fed. Rep. of Germany ....... 4121340

[51] Int. Cl.$^5$ ................................ B32B 3/00
[52] U.S. Cl. ........................ 428/73; 428/75; 428/116; 428/117; 428/251; 428/920; 428/921
[58] Field of Search ................ 428/57, 61, 73, 75, 428/117, 251, 920, 921, 116

[56] References Cited

U.S. PATENT DOCUMENTS

| | | | |
|---|---|---|---|
| 3,998,024 | 12/1976 | Frandsen | 428/73 |
| 4,946,725 | 8/1990 | Harlan | 428/73 |
| 5,160,248 | 11/1992 | Clarke | 428/117 |
| 5,270,092 | 12/1993 | Griffith et al. | 428/73 |

FOREIGN PATENT DOCUMENTS

| | | |
|---|---|---|
| 0117388 | 9/1984 | European Pat. Off. . |
| 2327604 | 10/1974 | Fed. Rep. of Germany . |
| 3411924 | 10/1985 | Fed. Rep. of Germany . |
| 736267 | 9/1955 | United Kingdom . |

*Primary Examiner*—James J. Bell
*Attorney, Agent, or Firm*—Watson, Cole, Grindle & Watson

[57] ABSTRACT

A thermal insulating layer for machine-like components includes several flat elements, mats or insulating cushions arranged to abut one another on the outside of the component. The individual elements abut each other with lateral front faces that are essentially perpendicular to the surface of the component thereunder. Both front faces of each pair of abutting front faces have at least one mutually complimentary shoulder.

9 Claims, 1 Drawing Sheet

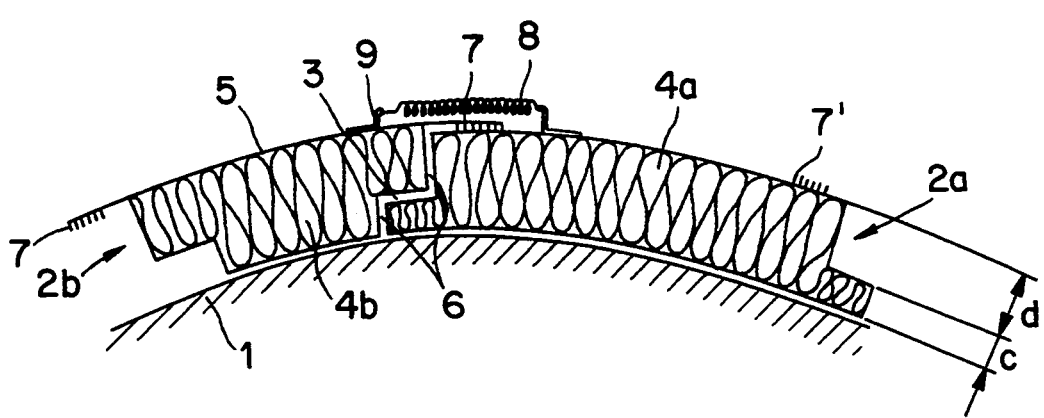

ered by the thickness of the insulation of the inner layer. The two layers lead to a larger number of individual pads. Apart from the expenditure for mounting and dismounting, the danger of a mixing-up is especially feared. Mixed-up insulating pads can lead to clearances and gaps in the insulating system and thus to serious consequential thermal stresses and deformations in the body of the machine.

INSULATION OF THERMAL MACHINES

BACKGROUND OF THE INVENTION

The present invention relates to a thermal insulating layer for body-like components, such as for instance machines, apparatuses, containers, equipment, gas and steam turbines and the like, including a plurality of planarly shaped elements or mats or pads, respectively located in an adjoining manner at the outside of the component.

The invention encompasses specifically thermal insulations for thermal machines, such as for instance gas turbines and steam turbines, which in case of inspection or revision of such machines must be easily removable and remountable. The object of the insulation of thermal machines is to reduce heat losses due to radiation and convection from the hot machine parts and to simultaneously ensure protection against contact. Decisive for the quality of an insulation in the field of thermal machines is a high heat resistivity, especially a value of heat resistivity over the entire surface to be insulated which is as constant as possible. Varying heat resistivities along the body of the machine lead positively to differing temperature distributions. These cause thermal stress or thermal deformations of the body of the machine which specifically in case of rotating thermal machines having small dimensional tolerances, can lead to considerable damage or even total destruction.

A special consideration for bodies of thermal machines consists in the complicated, spatial geometry of the surface. The turbines are for instance moulded bodies having surfaces which are spatially curved in various planes and with varying radii. This is augmented by numerous stubs and discharges which penetrate the curved surface. Every thermal machine needs periodic revisions or inspections for which the casing is opened whereby, the thermal insulation must be at least partially removed and remounted.

The known insulating systems feature various drawbacks. A procedure used specifically in early thermal machines is the hard coating. An insulating mass or fibrous material, respectively having a binding agent is sprayed on or applied by spatulas in a flowable state and forms after the setting a hard, concrete-like layer. This procedure has proven itself mainly in view of the complicated geometry of the surfaces and provided a jointless insulating layer having a constant heat resistivity. A drawback was, however, the high expenditure for maintenance operations. The insulating layer had to be destroyed at least in part and produced anew. Apart from the high work expenditure, the dust development was undesired too.

Another known procedure for insulating bodies of thermal machines uses a flexible insulation which can be removed and also remounted and which in accordance with the generally used insulating pads is soft. In order to achieve an approximate seamless structure the insulating pads are mounted in a staggered arrangement in two layers. Within a respective insulation layer the individual insulating pads can be mounted overlapped in order to still better stop heat losses due to convection through gaps. In this case the thickness of the insulation must be altogether constant in the area of the overlapping of two adjacent pads in order to not to locally increase the heat resistivity. This is made in this procedure by a wedge shaped, complimentary reduction of the thickness of the insulation at the area of the overlap. The drawback of this procedure is the high expenditure for the production at which the complicated geometry must be taken into consideration at the inner and the outer layer, as well. The parts of the inner and the outer layer are generally not in registry because the radii of curvature of the outer layer are increased by the thickness of the insulation of the inner layer. The two layers lead to a larger number of individual pads. Apart from the expenditure for mounting and dismounting, the danger of a mixing-up is especially feared. Mixed-up insulating pads can lead to clearances and gaps in the insulating system and thus to serious consequential thermal stresses and deformations in the body of the machine.

The object of the present invention is, therefore, the provision of a flexible insulation for thermal machines which can be demounted and also be mounted again and which is soft according to the principle of commonly applied insulating pads in order to render itself adjustable to the geometrically complicated surface to be insulated. It shall specifically reduce the number of the individual parts and ensure inspite thereof a substantially gap-less and practically constant heat resistivity over the entire surface.

SUMMARY OF THE INVENTION

In accordance with the invention this object is reached by a thermal insulating layer which is formed by a plurality of mat- or pad-like elements placed in an abutting adjoining manner at the outside of the component, whereby the individual elements abut each other by a front surface formed substantially perpendicularly to the surface of the component located thereunder, and whereby any two abutting front surfaces include at least one complimentary step, which steps are formed in an opposite manner. This stepping is such that the joint of separation between the two elements, which extends substantially perpendicularly to the surface of the component, comprises at least one step, and the two elements engage each other or overlap mutually, respectively by their front surfaces along this stepping.

In order to eliminate the initially mentioned drawbacks of the wedgelike complimentary shaped areas of overlap due to the differing curvature of the surface of the component of the machine located thereunder, the step is formed preferably substantially transverse or perpendicularly, respectively relative to the joint of separation or the face surfaces, respectively. In other words, this step extends substantially parallel to the surface of the machine component or parallel, respectively to the inner skin of the insulation element which lies on top of the surface and parallel to the opposite outer skin of the insulation element. Accordingly, it is at least within certain limits substantially unimportant what for contours or curvatures, respectively the component to be insulated posesses, in that the complimentary steps of the two front surfaces abut each other substantially at all times, such that the insulation at the area of the joint of separation corresponds substantially to the one in the area of the element.

In order to be in a position to use all elements equally for the assembling of the insulating layer, it is additionally of advantage if the stepping is located at the element substantially at the center area of the front surface between the inner and outer skin at the element. In other words, the distance along the joint of separation from the surface of the component up to the step shall be substantially equal to the distance between the step and the outer surface or outer skin, respectively of the element.

By means of the element defined in accordance with the invention for the construction of the thermal outer insulation on components it is possible to place one or several layers of insulation on the component. Of importance is, thereby, that the individual elements such as insulation mats or insulation pads overlap respectively inside the respective layer along the joint of separation in accordance with the invention by means of complimentary steppings. It is, thereby, possible that the elements overlap by means of one or, however, by means of several steps.

Further preferred variants of embodiments of the inventive insulating layer are characterized in the depending claims, whereby the individual elements forming the insulating layer, such as insulating pads or mats can be placed preferably again removable at the component.

For the mounting of the adjacent and abutting elements forming the insulating layer the known Velcro-fasteners are for instance suitable, which are arranged in such a manner that they overlap the joint of separation of two adjacent elements.

It is, however, also possible to additionally keep two elements together by means of a mechanical tension device, such as for instance a spring between two hooks of which one each is located on an element.

Following, now, the invention will be explained by example and with reference to the appended figure.

DESCRIPTION OF THE FIGURE

The appended FIGURE illustrates a cross-section through an insulating layer located in accordance with the invention on a thermal component of a machine, two abutting elements of this insulating layer being illustrated.

As shown in the FIGURE mounted on a body 1 of insulation consists of one single layer of insulating elements 4a and 4b, of which the thickness of the insulation is determined by the demands of the thermal insulation effect. The individual elements or pads 4a and 4b comprise at their ends front surfaces 2a and 2b, respectively which extend substantially perpendicularly to the local surface of the body 1 of the machine located thereunder.

Accordingly, the pair-wise oppositely located front surfaces 2a and 2b of a pad which are located at a curvature as illustrated do not run parallel to each other. The pad forms, therefore, a spatially curved body adapted to the spatial contour of the body 1 of the machine, of which the outer skin and the inner skin do not register.

A pad 4b stepped inwards and an adjacent pad 4a stepped outwards are illustrated. The filling of the pad consists of an insulation material corresponding to the demands of the insulation and of the particular temperature range. Mainly used are mineral fibres or ceramic fibres. The cover of the pad can consist for instance of a mechanically rugged and temperature resistant textile weaving. The individual parts of the cover of the pad consist of geometrically cut planar pieces of a textile weaving, which at the joining edges are sewn with heat resistant glass fiber threads.

Excepting the outer skin 5, the cover of the pads 4a and 4b consist normally of an industrial glass weaving which is for instance reinforced by a woven in wire. In contrast thereby the outer skin 5 consists for instance of a spray-water proof glass fiber weaving having an aluminum foil applied by vapor deposition. These statements are obviously only examples and the mentioned insulating mats or insulating pads, respectively 4a and 4b, can be formed obviously in accordance with any other suitable design.

Decisive for the invention is now that the front surfaces 2a, 2b overlap along the joint 6 of separation by means of a step 3 extending perpendicularly thereto. Of importance is, thereby, that the step 3 extends approximately parallel to the surface of the machine component 1, such that the two pads 4a and 4b in any case abut each other or lie on top of each other tightly along the step 3 in any case. Also in such a case, where the joint of separation has a gap at the area where it extends perpendicularly to the surface of the component of the machine, a sufficient heat insulation is ensured in spite thereof, because the gap through the joint of separation can never extend over the entire width of the insulating pads 4a and 4b. This ensures that even at the area of the joint 6 of separation, the heat insulation is at least sufficient, but however, differs only slightly from the corresponding heat insulation at the area of the individual insulating pads 4a and 4b.

In order to cover or close, respectively the gap 6 between the two pads 4a and 4b which is preferably a butt joint, preferably an industrial Velcro-fastener 7 is applied. This can be achieved for instance in that at least one of the pads 4b has flaps projecting from its outer skin 5 which incorporate the hook portion of the Velcro-fastener. The receiving part 7' of the Velcro-fastener is located on the outer skin of the adjoining pad 4a. By means of this Velcro-fastener a solid mechanical coupling of the two pads among each other is achieved and the gap is protected against a penetrating of spray water, as well.

Quite obviously it is also possible to provide additionally a mechanical coupling by means of a spring 8 which can be stretched between sewed on hooks 9 of two adjacent pads. The tangential tension of the spring produces a pressing-on force over the domed body of the machine, which presses the pads 4a and 4b directly and uniformly against the hot surface. For additional safety of the mechanical fastening, belts made of a glass fiber weaving and with a quick-acting clamping device can be streched over the layer of pads.

Obviously, at both sides of the two illustrated pads 4a and 4b further insulating mats or insulating pads structured in accordance with the invention are placed in order to insulate the component 1. In order to be required to provide only one kind or at most two kinds of pads for the assembly of the inventive insulating layer, the step 3 is located preferably at the pad at front surfaces 2a and 2b, respectively at the center between the outer skin and the inner skin. This means with reference to the FIGURE that the distance c is equal to the distance d. In this way it is possible to reduce the number of different pads for the insulating of components which have different radii of curvature.

The inventive insulating layer described by example with reference to the FIGURE can obviously be modified or varied in any arbitrary way. Specifically, the design of the individual insulating mats or insulating pads, respectively mentioned as examples can be selected differently corresponding to prevailing demands. The described invention facilitates the production, the assembling and disassembling of an outer insulation at a component of a machine. Due to the reduction to one single insulating layer or insulating coating the initially mentioned expenditure for the production of cut-outs and penetrations occurs only once. By the geometry of the pads every part is defined and localized. There is no danger of confusions. The thermal advantages of a double layer insulation are equalized by the step and the also mentioned surface flap including the Velcro-fastener of the pads. In this way, the gap losses can be suppressed.

I claim:

1. Thermal insulating layer for body-like components such as machines, apparatuses, containers, equipment, gas and steam turbines and the like, which includes a plurality of planarly shaped elements or mats or pads, respectively located in an adjoining manner at an outside of the component, wherein the individual elements join each other substantially tightly by front surfaces extending substantially perpendicularly to a surface of the component located underneath the elements, whereby any two adjoining front surfaces comprise mutually a complimentary step, such that the joint of separation between two elements which extends substantially perpendicularly to the surface of the component comprises a step and the two elements engage each other or overlap each other, respectively by their front surfaces along this step.

2. Thermal insulating layer according to claim 1, wherein the step is formed substantially transverse or perpendicularly, respectively to the joint of separation or the front surfaces respectively.

3. Thermal insulating layer according to claim 1, wherein at one separating joint of two elements one of the front surfaces is stepped from an element outwards, extending in the direction of the joint of separation from the component outwards, and the other front surface of the other element is stepped towards the inside complimentary or at least almost precisely fitting into the element.

4. Thermal insulating layer according to claim 3, wherein the stepped overlap extends along the entire joint of separation of two adjacent elements.

5. Thermal insulating layer according to claim 1, wherein a first distance along the joint of separation from the surface of the component up to the step equals substantially a second distance from the step to the outer surface of the element.

6. Thermal insulating layer according to claim 1, wherein one or a plurality of superimposed layers of the elements, such as insulating mats or insulating pads, are placed on the component, whereby the elements within the respective layer overlap each other along the complimentary step or along a plurality of steps.

7. Thermal insulating layer according to claim 1, wherein said elements are spatially curved, substantially conform to a curved machine-like component present thereunder and to be insulated.

8. Thermal insulating layer according to claim 1, wherein including a hook and loop fastener means for connecting two adjoining elements together along a separating joint, said fastener means overlapping the joint of separation.

9. Thermal insulating layer according to claim 1, wherein two including a mechanical clamping device for connecting adjoining elements, said mechanical clamping device including a spring between two hooks mounted on the adjoining elements.

* * * * *